June 28, 1960
E. WAINER
2,943,031
ELECTRODES AND METHODS OF MAKING SAME
Original Filed Aug. 12, 1953
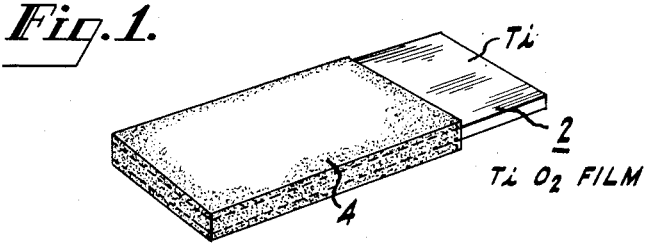
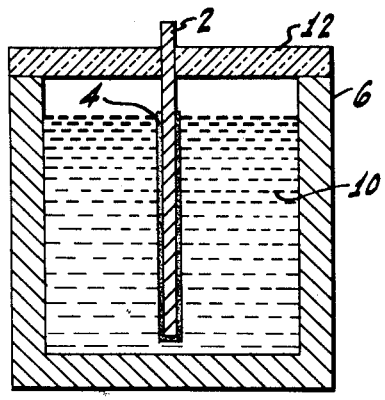
INVENTOR.
EUGENE WAINER
BY
ATTORNEY United States Patent Office 2,943,031
Patented June 28, 1960

2,943,031
ELECTRODES AND METHODS OF MAKING SAME

Eugene Wainer, Cleveland Heights, Ohio, assignor to Radio Corporation of America, a corporation of Delaware Original application Aug. 12, 1953, Ser. No. 373,840. Divided and this application Nov. 3, 1958, Ser. No. 771,470

4 Claims. (Cl. 204—37)

This application is a division of my copending application, Serial No. 373,840, filed August 12, 1953, now abandoned.

This invention relates to electrolytic cells such as capacitors and more particularly to novel electrodes comprising titanium and titanium dioxide for use in such cells and methods of making them.

Many commercial electrolytic capacitors include an aluminum electrode bearing a relatively thin coating of aluminum oxide. The dielectric constant of aluminum oxide is only about 12. However, relatively high ratios of capacity to size are realized in capacitors utilizing aluminum because of the extreme thinness of the aluminum oxide film. It is believed that such films are about $10^{-5}$ to $10^{-4}$ cm. thick.

Titanium dioxide occurs in three principal crystalline forms, anatase, brookite and rutile. Anatase, also known as octahedrite, has a tetragonal structure with an octahedral habit. Brookite has an orthorhombic structure and is relatively rare. Rutile, the most stable form, has a tetragonal structure with a prismatic habit.

The relatively high dielectric constants of titanium dioxide in its various forms are well known: 30 for anatase, 78 for brookite and 112 for rutile. Thus, a film of titanium dioxide having a thickness comparable to the thickness of an aluminum oxide film will provide an improvement in capacity of about ten times that of present commercial capacitors having the same electrode area. It is known to make titanium dioxide in all its forms but it has proven difficult to make thin, continuous films of titanium dioxide, especially in the form of rutile.

Accordingly, it is an object of the instant invention to provide novel methods of making thin, continuous and adherent oxide films on titanium surfaces.

Another object is to provide novel electrodes for use in electrolytic cells.

Another object is to provide an improved electrolytic cell.

Another object is to provide novel methods of making electrodes suitable for use in electrolytic cells.

A further object is to provide improved electrodes comprising titanium dioxide suitable for use in electrolytic cells.

A still further object is to provide novel electrolytic electrodes comprising titanium dioxide in rutile form.

It has now been found that relatively thin, continuous and adherent oxide films may be formed upon a titanium surface. In particular, two methods appear to be especially advantageous. According to the first method titanium metal is heated in an oxidizing atmosphere to form a film of rutile upon its surface. This film is then electrolyzed in an alkaline solution to seal up pores and cracks produced by the heating. The second method comprises electrolyzing titanium metal in an acid solution to form a film of anatase on its surface, and subsequently heating the film in a controlled inert atmosphere to convert it to rutile.

The invention may be more easily understood by reference to the following detailed description and to the drawing of which:

Figure 1 is a schematic, perspective view of an electrode formed according to the instant invention.

Figure 2 is a schematic, cross-sectional, elevational view of an electrolytic cell utilizing an electrode similar to that shown in Figure 1.

Similar reference characters have been applied to similar elements throughout the drawing.

According to one embodiment of the invention a film of rutile may be formed on a titanium surface by heating the surface to 700°–1100° C. in an oxidizing atmosphere such as air, oxygen, or steam. Prior to heating the titanium surface is etched in a 5% hydrofluoric acid solution for about one minute to remove impurities including oxides of titanium that may be present upon the surface. The surface is then heated in a dry oxygen atmosphere or in superheated steam at about 750° C. for about twenty minutes. The titanium surface oxidizes forming titanium dioxide in the crystalline form known as rutile. The film thus formed is not continuous and if employed as an electrode in a cell with any of the commonly used electrolytes, permits a relatively high direct-current flow.

To make the film continuous the titanium surface, bearing the rutile coating, is electrolyzed in a solution of sodium hydroxide or any other solution of equivalent alkalinity such as potassium hydroxide. The concentration of the sodium hydroxide solution may be from 0.5% to 20% and is preferably 2% to 3% by weight. The titanium is made anodic, and electrolysis is carried out at about 6 volts for about ten minutes. The voltage is then gradually increased up to the maximum voltage the electrode is to withstand in service. The hydroxide reacts with any titanium metal that may be exposed through pores or cracks in the surface of the rutile and seals up such pores and cracks with titanium dioxide, probably in anatase form.

Titanium-rutile electrodes so formed may be utilized as anodes in capacitors with any of the usual electrolytes such as phosphoric acid or boric acid. A capacitor utilizing a titanium-rutile electrode has about twenty times as great electrical capacitance per unit area of the electrode as a comparable capacitor utilizing a similar aluminum electrode.

A preferred embodiment of the invention comprises a method of producing on a titanium surface a film of rutile having a somewhat greater degree of continuity than a film produced by the method heretofore described.

According to the preferred embodiment of the instant invention a titanium surface is initially etched in 5% hydrofluoric acid to clean it thoroughly. It is then electrolyzed anodically in a solution comprising the proportions of 100 cc. ethylene glycol, 100 cc. water and 10 grams phosphoric acid. In the electrolyzing step the current is controlled at about 200 ma. per sq. inch of titanium surface until a desired voltage is reached. The desired voltage will depend upon the eventual use to which the electrode is to be put and should be at least as great as the peak voltage to be applied to the electrode when it is operated in a circuit. When this voltage is reached it is maintained constant, and the current is allowed to decrease to a value of about 4 to 8 ma. per sq. inch. The electrolysis forms a relatively thin, continuous film of anatase upon the surface of the titanium.

The electrolysis may, alternatively, be carried out in other mild oxidizing acid solutions such as boric acid. The strength of the solution is not critical to form an anatase film. However it has been found that electrolysis in the preferred solution produces an anatase film having a relatively high degree of continuity and relatively few pores and cracks.

An anatase film so formed may be utilized in an electrolytic cell. However, since the dielectric constant of rutile is almost four times that of anatase, it is desirable to convert the anatase film to rutile. This film may be converted to rutile by heating to 700°–1100° C. in an atmosphere which is inert with respect to the titanium dioxide. An atmosphere of carbon dioxide, steam or of any of the gases in the helium column of the periodic table is satisfactory. The heating is preferably carried out at about 750°–900° C. At temperatures below 700° C. anatase does not convert to rutile and at temperatures below about 750° C. the conversion is relatively slow. At temperatures above 900° C. anatase converts rapidly to rutile and the process is difficult to control. Above 1100° C. the oxide is reduced.

After the film has been converted to rutile by heating it may be directly utilized in an electrolytic cell comprising a mild acid electrolyte. It is preferred, however, in order to minimize leakage current in a cell, to electrolyze the converted film in a sodium hydroxide solution as in the preceding embodiment.

An electrode produced according to the invention is illustrated in Figure 1 which shows a titanium sheet 2 coated with a film 4 of rutile. Such an electrode may be conveniently utilized in a capacitor as shown in Figure 2.

Figure 2 shows a conventional wet-type capacitor comprising a metallic container 6 which may be, for example, of copper or zinc. In the container is an electrolyte 10 such as a 2%–3% solution of sodium hydroxide. An electrode 2 of titanium bearing a film 4 of rutile on its surface is immersed in the electrolyte and supported by an insulating lid 12 that covers and seals the container. The electrode projects through the lid to facilitate making an electrical contact to it. The container may be utilized as the second electrode of the device.

Electrodes produced in accordance with the preferred embodiment of the instant invention provide about the same advantageous ratio of capacity to area as do electrodes produced according to the first described embodiment. Electrodes formed in accordance with the preferred embodiment, however, comprise rutile films of greater continuity and permit smaller leakage currents in capacitors utilizing them than do the first described electrodes.

Many expedients have been utilized previously to increase the effective surface area of aluminum electrodes for use in capacitors. Such devices as roughening the surface by sandblasting or etching, spraying the metal upon a porous support such as gauze, and forming an electrode of compressed metallic powder have all been utilized. All of these methods and others are similarly effective to increase the surface area of a titanium electrode. The comparisons heretofore given between electrodes produced according to the instant invention and previous electrodes of aluminum are based upon a continuous flat electrode surface both for aluminum and for titanium. It will, therefore, be seen that when the advantages of the instant invention are compounded with the advantages derived from these surface area multiplying devices, electric capacitors having an improved ratio of size to capacity are provided.

Electrodes formed according to the instant invention may be utilized in capacitors with substantially the same electrolytes as capacitors utilizing aluminum. Electrolytes such as phosphoric acid and boric acid dissolved in water, glycol or glycerine are suitable. Sodium hydroxide or ammonium hydroxide in water or in glycerine also give satisfactory results. The alkaline electrolytes are preferred since, in general, capacitors utilizing them with the electrodes according to the invention exhibit a lower leakage current than do similar capacitors utilizing acidic electrolytes. Electrolytes in either dry, semi-dry or wet form may be employed.

Electrodes produced according to the invention have a relatively high ratio of capacity to physical size, that is to say, a relatively small capacitor utilizing a titanium-rutile electrode exhibits a relatively high electrical capacity.

What is claimed is:

1. A method of making an electrode comprising electrolyzing a titanium surface anodically in an oxidizing acidic solution to form a film of anatase on said surface, and subsequently heating said surface and said film in an atmosphere, inert with respect to said surface, at 700° C.–1100° C. thereby to convert said anatase film to rutile.

2. The method according to claim 1 wherein a solution comprising the proportions of about 100 milliliters ethylene glycol, 100 milliliters water and 10 grams phosphoric acid is employed in said electrolyzing.

3. The method according to claim 1 in which said inert atmosphere consists of a gas selected from the class consisting of carbon dioxide, steam, and the gases of the helium column of the periodic table.

4. The method according to claim 3 in which said inert atmosphere consists of steam.

References Cited in the file of this patent

UNITED STATES PATENTS

| | | |
|---|---|---|
| 2,504,178 | Burnham et al. | Apr. 18, 1950 |
| 2,874,102 | Wainer | Feb. 17, 1959 |